March 13, 1945.   R. PLACE   2,371,542
SYNCHRONIZED FEED BED AND STATIONARY MICROFILM CAMERA
Filed July 17, 1942   4 Sheets-Sheet 3

Inventor
Robert Place,
By [signature]
Attorney

March 13, 1945.  R. PLACE  2,371,542
SYNCHRONIZED FEED BED AND STATIONARY MICROFILM CAMERA
Filed July 17, 1942  4 Sheets-Sheet 4

Inventor
Robert Place,
By
Attorney

UNITED STATES PATENT OFFICE 2,371,542

SYNCHRONIZED FEED BED AND STATIONARY MICROFILM CAMERA

Robert Place, Waltham, Mass., assignor to Graphic Microfilm Service, Inc., Waltham, Mass., a corporation of Massachusetts Application July 17, 1942, Serial No. 451,328

7 Claims. (Cl. 88—24)

This invention relates to improvements in microfilm cameras and has for its particular object the synchronization of a feed bed with the camera whereby to greatly expedite the microfilming operation. The invention contemplates the provision of a combined camera and feed bed coordinated to accomplish the aforesaid objective in a manner hereinafter exemplified and it also contemplates the provision of a feed bed which may be employed as an attachment in conjunction with existing microfilm cameras also to accomplish the same objective.

In its general aspects the invention provides for positioning manuscript copy while the preceding copy is being photographed, advancing the copy into the photographic field while the film is being advanced, and the automatic withdrawal and stacking of the photographed copy from the field. In its specific aspects the invention may include an electric cam means for operating the camera and feed bed in the desired synchronism.

Other objects and advantages of the invention will be apparent in the accompanying drawings wherein a preferred embodiment of the principles of the invention has been selected for exemplification.

Figure 1:
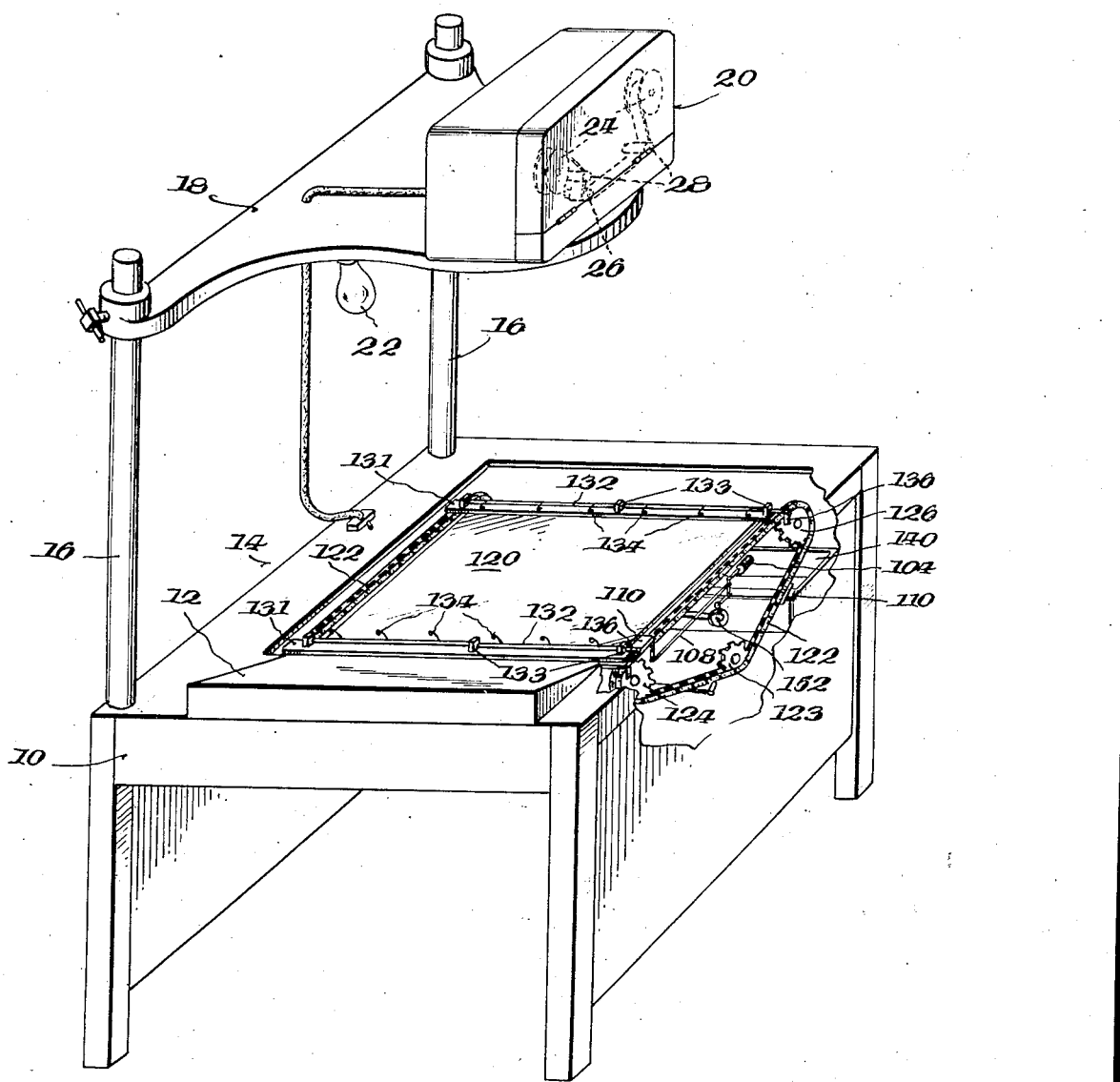
Fig. 1 is a perspective view of a combined feed bed and microfilm camera.

Referring in detail to the drawings wherein like numerals refer to like parts, the apparatus of Fig. 1 embraces a table 10 having a feed shelf 12 directed toward the lead edge of the feed bed indicated in its entirety at 14. The table 10 is provided with a pair of uprights 16 supporting at their upper extremities an adjustable camera support 18 upon which a camera box 20 is swivelled. A suitable light source 22 is directed toward the feed bed 14 to provide illumination for the manuscript copy being photographed.

The camera box 20 is longitudinally divided by partition wall 23 separating the film compartment from the film actuating mechanism. A pair of film reels 24 is rotatably supported in any suitable manner in the film reel compartment, and supported adjacent to the film reels is a roller system for guiding and advancing the film. This roller system is preferably composed of a driven roller 26 and a pair of guide or tension rollers 28 positioned at opposite sides of relatively adjustable mask plates 30 framing the lens aperture indicated at 32.

Masks 30 are one each secured to one of a pair of opposed gear racks 34 which are held for relative movement in unison by a pair of gear wheels 36 one each provided at adjacent ends of the gear racks. In driving engagement with one of the gears 36 is a shaft 38 projecting outwardly of the housing 20 and provided with a calibrated control knob 40. It will be apparent that clockwise or counterclockwise movement of the calibrated knob 40 will move the masks 30 toward or away from each other to decrease or increase the photographic field.

A small electric motor 42 is suitably supported in the other compartment of the housing 20, the said motor adapted to be actuated during the actual operations of exposure and film advance as will hereinafter be explained. A drive gear 44 on the motor shaft is meshed with a larger gear 46 on the main camera shaft 48 which has keyed thereto a bevel gear 50 meshing with another bevel gear 52 keyed to a stub shaft 54 rigidly carrying a shutter 56 for rotation in front of camera lens 32. At its side adjacent to the film supporting mechanism, the large gear 46 carries a cam 58 which engages a roller 60 attached to a gear rack 62 suitably supported for reciprocation in the housing. Meshing with the teeth of rack 62 is a spur gear 64 fixed by means of a sleeve 66 to an arm 68 journaled upon film reel drive shaft 70. Pivotally supported upon the arm 68 is a pawl 72 coacting with a ratchet wheel 74 keyed to the shaft 70.

It will now be apparent that as the cam 58 rotates with the large gear 46 it will engage at its high point the roller 60 projecting from gear rack 62 so as to move the gear rack 62 against the tension of spring 76 extending between the casing wall and the end of the gear rack 62 opposite to the roller 60. This movement of gear rack 62 will tend to rotate the assembly including gear 64 and arm 68 thus causing the pawl 72 to glide over the teeth of ratchet wheel 74. This action has the effect of cocking the gear rack 62 so that upon continued movement of the cam 58 to release roller 60 the tension of spring 76 will withdraw gear rack 62, but on movement of the gear rack in this direction the assembly including the gear 64 and arm 68 will, through locking engagement of the pawl 72 with the teeth of ratchet gear 74, rotate film drive shaft 70 for rotation or advance of film drive roller 26 to effect film advance. A spring belt 75 is trained over a pair of V-pulleys, one keyed to the shaft 70 and another to spindle shaft 73 to drive the film take-up reel.

Projecting from an intermediate portion of the gear rack 62 is an abutment 78 which engages a stop 80 carried by one of the masks 30 for the purpose of limiting the travel of gear rack 62 in accordance with the position of the masks relative to the lens 32 so that film advance will be coordinated with the size of the field opening.

Figure 4:
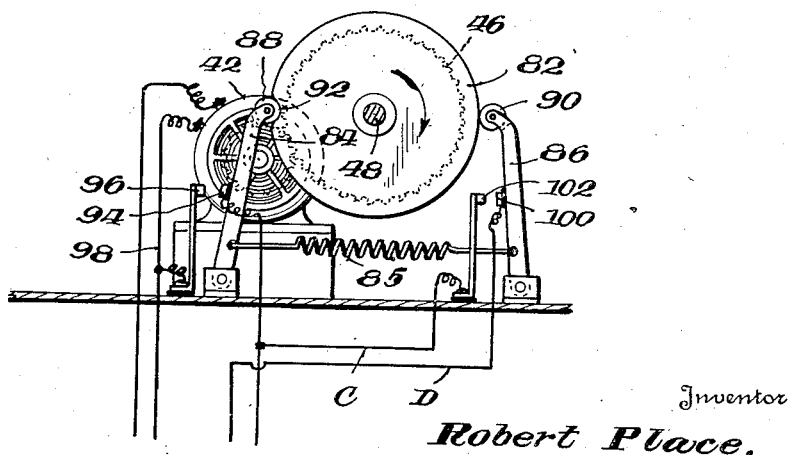
Fig. 4 is an enlarged detail of the camera actuating mechanism.

As best shown in the enlarged view of Fig. 4, a control cam 82 is keyed to main drive shaft 48 at a point adjacent to a rear wall of the casing 20. At opposite peripheral sides of cam 82 are pivoted arms 84 and 86 each having at its free extremity a roller member 88 and 90, respectively, each adapted to engage a groove 92 provided in the periphery of the control cam 82 for a purpose which will hereinafter follow.

Pivoted arms 84 and 86 are tensioned toward each other by means of a spring 85 and the rollers 88 and 90 are adapted to engage groove or seat 92 at predetermined intervals to rock their respective arms for make and break of the electric circuit through a movable contact carried by each of the arms and an opposed stationary contact.

Figure 2:
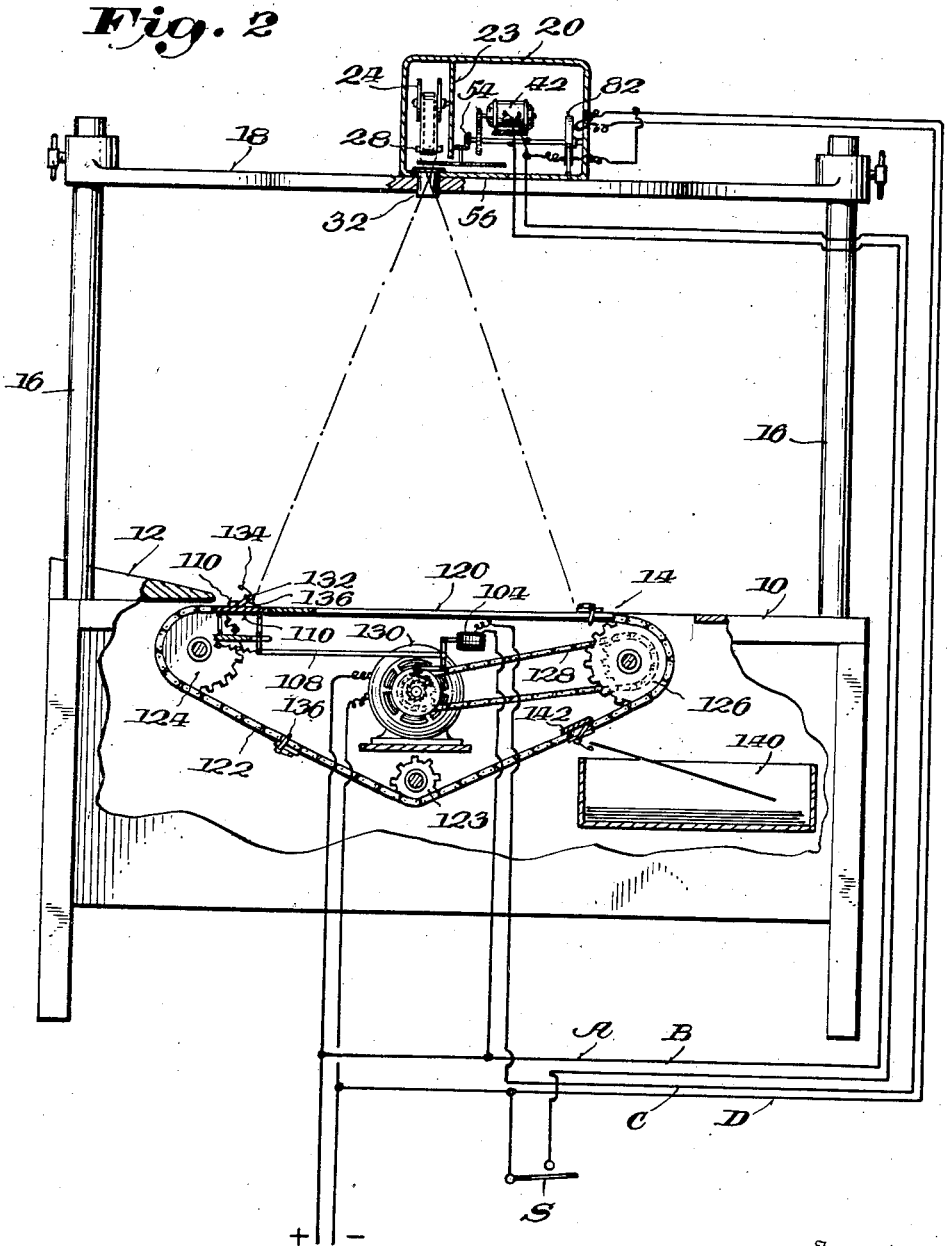
Fig. 2 is a side elevational view partly broken away of the apparatus of Fig. 1 but with the camera box turned at a right angle to the position of Fig. 1.
Figure 3:
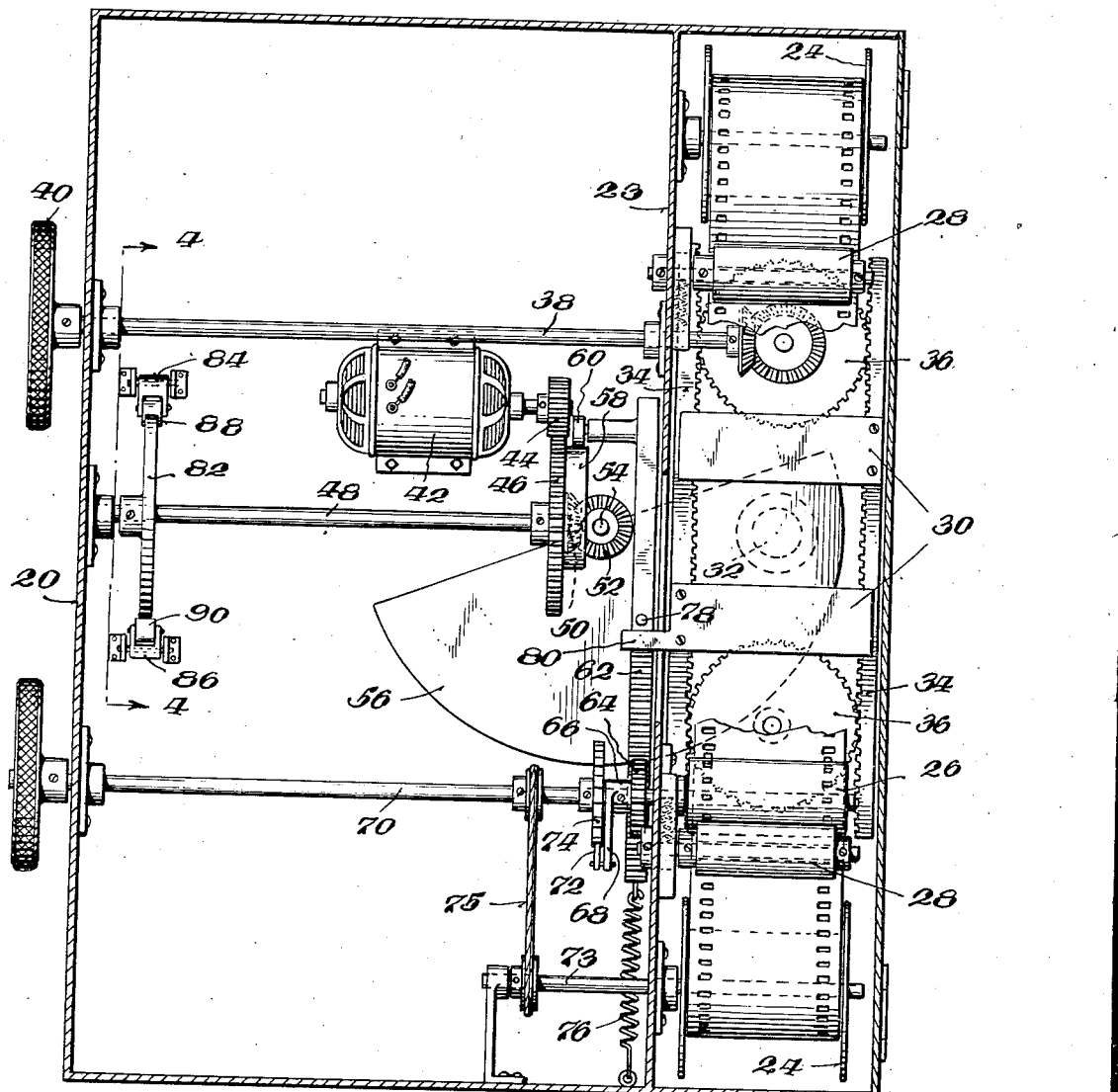
Fig. 3 is a plan view looking downwardly into the camera box.

As best shown in Fig. 2, conductor A supplies one side of the electrical circuit to the motor 42. The circuit to motor 42 is completed through the conductor B upon the momentary actuation of the foot pedal diagrammatically shown at S at the bottom of Fig. 2. Rotation of control cam 82 and shaft 48 as the result of energization of the motor 42 will throw roller 88 carried by arm 84 out of the groove 92 thus to move contact 94 into engagement with the fixed contact 96 electrically connected to the motor by conductor 98 to thereby effect continuous operation of the motor even though the foot pedal may no longer be depressed. Upon completion of a single revolution of the control cam 82 roller 88 will again seat in the groove 92 to break the contacts 94 and 96 to deenergize the motor. During this cycle the main drive shaft 48 connected with the shutter by the mechanism hereinbefore described will impart a complete revolution to the shutter and effect film exposure and advance.

The roller 92 carried by the opposed pivoted arm 86 is so positioned with respect to the roller 88 as to engage in the groove 92 upon completion of the exposure period only of the cycle. Upon rotation of the groove 92 for engagement with roller 90, arm 86 will rock to close contacts 100 and 102 to complete the circuit through conductors C and D leading to the feed bed actuating mechanism now to be described. It will now be seen that completion of a single rotation of cam 82 from contact of its groove 92 with the roller 90 to its starting position in contact with the roller 88 represents the film advance part of the cycle.

The feed bed includes a stationary plate 120 positioned in the photographic field of the camera. On opposite sides of the plate 120 are endless chains 122, each trained over idler sprockets 123 and 124 and a driven sprocket 126 intermittently driven by chain 128 connecting with electric motor 130 and a one-revolution clutch mechanism to be described below.

Extending between and secured in longitudinally spaced positions on the chains 122 are cross plates 131 which are arranged to travel just above the bed plate 120. Pivotally supported in bearings 133 on each of the cross plates 131 is a shaft 132 each supporting a plurality of manuscript copy engaging fingers 134. The shafts 132 are spring tensioned so that the fingers 134 lie normally in a plane substantially parallel to their respective cross plate so as to engage an edge of the manuscript copy therebetween. At at least one extremity of each of the shafts 132 a depending rocker member 136 is secured outwardly beyond the plane of a chain 122.

Figure 5:
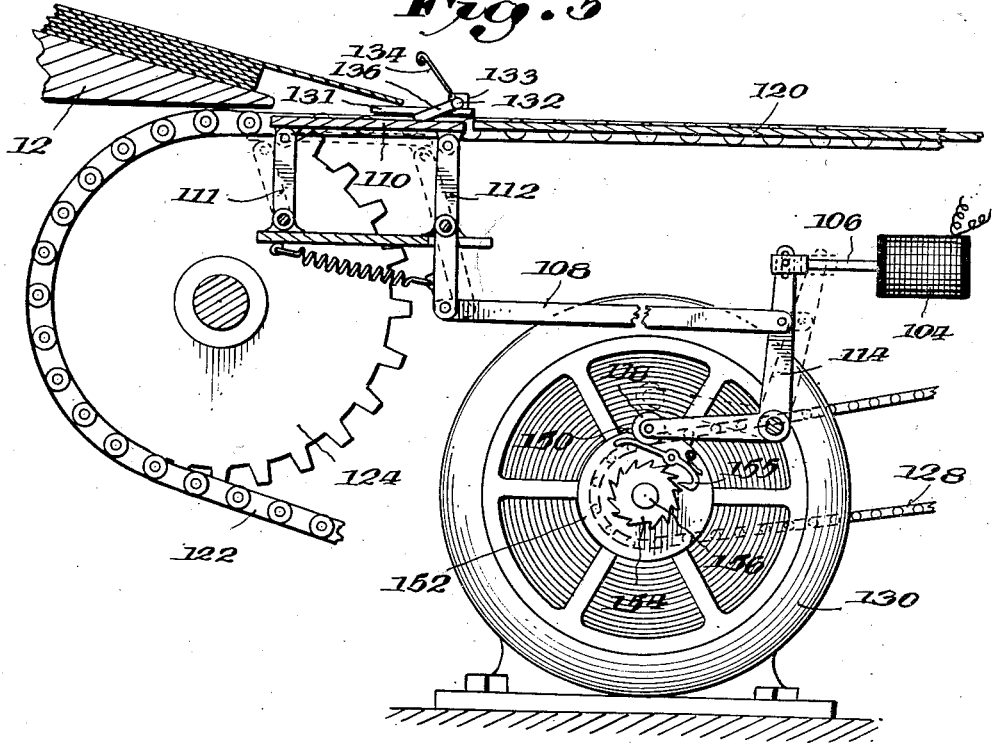
Fig. 5 is an enlarged detail view of the feed bed actuating mechanism.

Positioned at the entrance edge of bed plate 120 and in substantially the same vertical plane as the rocker member 136 is a platform 110. Legs 111 and 112 pivotally support the platform 110 in an elevated position as shown in Figs. 1, 2 and 5 wherein a rocker 136 has ridden up on the surface of the platform and rocked its shaft 132 to raise the fingers 134 prior to receiving manuscript copy fed from the shelf 12 and in a lower position shown in dotted line in Fig. 5 wherein the spring tensioned shaft 132 is returned to normal position permitting the fingers 134 to engage the fed copy to convey the same into the photographic field. Copy, after photographing and withdrawn from the photographic field, is discharged into a basket or the like 140 when engagement of the rocker with a fixed trip 142 again pivots the fingers 134 away from their cross plate 132 to release the copy and drop the same upside down into the basket.

The platform 110 is thus actuated by a bar 108 pivoted to the leg 112 and connected by a link 106 to a solenoid 104. Also, pivotally attached to the link 106 is a rocker arm 114 carrying at its free end a roller 118 shown bearing in seat 150 of the plate 152 of a one-revolution clutch assembly. This assembly includes ratchet gear 154 keyed to the continuously rotating shaft 156 driven by the motor 130 and a pawl 155 disengaged from the ratchet teeth when the roller 118 bears in seat 150 and engaged with the ratchet teeth when the roller is unseated. Idler plate 152 carries a sprocket for the drive chain 128 and the arrangement is such that the copy feeding means is actuated when the pawl is engaged and interrupted when the pawl is disengaged.

The circuit through the solenoid 104 is completed through the conductor C and, reverting to the camera actuating mechanism, it will be recalled that the circuit through conductors C and D is completed when arm 86 is rocked to close contacts 100 and 102 and the control cam 82 begins the film advance part of the cycle. At this point the solenoid 104 is energized to rock the arm 114, removing roller 118 from the seat 150, pawl 155 then engaging ratchet 154 to rotate plate 152 which in turn drives the endless chains 122 of the feed bed to advance copy simultaneously with film advance.

Although the contacts 100 and 102 are but momentarily closed, this brief energization of the solenoid 104 is sufficient to unseat the roller 118 to enable the pawl to drive the plate 152 for a complete revolution and advance the feed bed chains 122 the distance from one of the cross plates 132 to the next succeeding cross plate.

One complete revolution of the plate 152 is the equivalent of a partial revolution of the control cam 82 from the engagement of roller 90 with the groove 92 to the point of engagement of the roller 88 in the groove 92, which represents the film advance period of the camera cycle and the copy advance period of the bed. Continued rotation of the control cam 82 to the point of engagement of roller 90 in the groove 92 represents the exposure period of the cycle and of course during this period the roller 118 is seated to prevent drive engagement of the pawl 155 and the copy is held stationary in the photographic field until seating of roller 90 in groove 92 of the control cam closes the circuit through contacts 100—102 to the solenoid 104 to repeat the cycle.

It will be apparent that the aforesaid cyclic periods will result whether the foot pedal S is intermittently actuated or continuously depressed. By maintaining the pedal or other switch continuously closed the skilled operator can microfilm copy with the present apparatus far more rapidly than with equipment hitherto available and with the utmost efficiency considering the intermittent exposure and film advance periods of a stationary camera. The particular type of camera is not important in the present invention but the synchronized feed bed and camera actuating mechanism thereof may be employed as an attachment with any suitable camera.

It will be understood that the specific mechanism and arrangement of parts herein illustrated and described are exemplary only of the principles of the invention as defined in the following claims.

What I claim is:

1. A machine for photographing documents comprising, a stationary camera, electrically controlled film advance and support means for said camera, a stationary bed in the photographic field of said camera, an endless drive means adjacent said bed, document-engaging means carried by said endless drive means and adapted to traverse said bed across the photographic field, means periodically driving and interrupting said endless drive means, said latter means being accommodated by said camera control means to move said document-engaging means across the bed to position a document thereon during the film advance part of the camera cycle and to interrupt said movement to hold the document so positioned stationary during the exposure part of the camera cycle, the document-engaging means being pivotally mounted with respect to said endless drive means and being included in the combination to pivot said document-engaging means outwardly of the bed prior to traversion and across and during an interrupted period in its movement so that a document may be fed against the document-engaging means, and means for pivotally moving the document-engaging means toward said bed in clamping engagement with the document at the beginning of its traversal and across to position the document on the bed in the photographic field of the camera upon completion of its traversal and during the interrupted period in its movement.

2. A machine for photographing documents comprising, a stationary camera, electrically controlled film advance and exposure means for said camera, a stationary bed in the photographic field of said camera, an endless drive means adjacent said bed, document-engaging means carried by said endless drive means and adapted to traverse said bed across the photographic field, and means periodically driving and interrupting said endless drive means, said latter means being actuated by said camera control means to move said document-engaging means across the bed to position a document thereon during the film advance part of the camera cycle and to interrupt said movement to hold the document so positioned stationary during the exposure part of the camera cycle, the means for periodically driving and interrupting the endless drive means including a solenoid and means actuated by the solenoid to selectively open and close the document-engaging means so that a document may be fed to the engaging means during the open period and clamped in the engaging means and drawn into photographing position on the bed during the closed period.

3. In a machine for photographing documents, a stationary camera including film advancing and exposure means, an electric motor for driving said advancing and exposure means, a feed device for advancing and positioning documents in the photographic field of said camera, said feed device including electrically controlled actuating means, a circuit connected to said electric motor, a second circuit connected to said electrically controlled actuating means, both said circuits being connected to a source of current, cam means driven by said electric motor in definite relation to said advancing and exposure means, a pair of sets of alternately actuated electrical contacts controlled by said cam, one set of said contacts being included in said second circuit with the said electrically controlled actuating means and the other set being included in the circuit of said electric motor, and a foot switch bridging said last mentioned contacts for initiating cycles of operation of said motor.

4. In a machine for photographing documents, a stationary camera including film advancing and exposure means, an electric motor for driving said advancing and exposure means, a feed device spaced apart from said camera for moving documents into the photographic field of the camera, said feed device including electrically controlled actuating means, a circuit connected to said electric motor, a second circuit connected to said electrically controlled actuating means, both said circuits being adapted to be connected to a source of current, a pair of electrical contacts included in said first circuit, a second pair of electrical contacts included in said second circuit, a cam driven by said electric motor for controlling the opening and closing of both said pairs of contacts and thereby timing the operating cycles of said machine, and a foot switch bridging said first pair of contacts for initiating cycles of operation of said machine.

5. In a machine for photographing documents, a stationary camera including film advancing and exposure means, an electric motor for driving said advancing and exposure means, a feed device spaced apart from and having a portion in the photographic field of said camera, said feed device including electrically controlled actuating means, a circuit for said electric motor, a second circuit for said actuating means, both said circuits being adapted to be connected to a source of current, a pair of cooperative electrical contacts in series with said first circuit, a second pair of cooperative electrical contacts in series with said second circuit, a cam driven by said electric motor for controlling the opening and closing of said pairs of contacts and thereby cyclically timing the machine, and a foot switch bridging at least one of said pairs of contacts for initiating cycles of operation of said machine.

6. In a machine for photographing documents, a stationary camera including film advancing and exposure means, an electric motor for driving said advancing and exposure means, a feed device spaced apart from and having a portion in the photographic field of said camera, a second electric motor for driving said feed device, clutching means connected to said second motor, electrically controlled actuating means for said clutching means, a circuit for said first electric motor, a second circuit for said second motor, a third circuit for said actuating means, all said circuits being adapted to be connected to a source of current, a pair of cooperative electrical contacts in series with said first circuit, a second pair of cooperative electrical contacts in series with said third circuit, a cam driven by said first-mentioned electric motor for controlling the opening and closing of said pairs of contacts and thereby timing the operating cycles of said machine, and a foot switch bridging at least one of said pairs of contacts for initiating cycles of operation of said machine.

7. The invention according to claim 6 in which said cam is so arranged that it can only close one pair of contacts while the other pair is open.

ROBERT PLACE.